Nov. 1, 1949     C. R. PETERS     2,486,977
MACHINE TOOL

Filed Jan. 30, 1946     13 Sheets-Sheet 1

INVENTOR:
Charles R. Peters.
BY
Williams, Bradbury & Hinkle
Attorneys

Nov. 1, 1949  C. R. PETERS  2,486,977
MACHINE TOOL
Filed Jan. 30, 1946  13 Sheets-Sheet 5

INVENTOR:
Charles R. Peters
BY
Williams, Bradbury & Hinkle,
Attorneys.

Nov. 1, 1949  C. R. PETERS  2,486,977
MACHINE TOOL
Filed Jan. 30, 1946  13 Sheets-Sheet 7

INVENTOR:
Charles R. Peters
BY
Williams, Bradbury & Henkel
Attorneys

Nov. 1, 1949  C. R. PETERS  2,486,977
MACHINE TOOL

Filed Jan. 30, 1946  13 Sheets-Sheet 8

INVENTOR.
Charles R. Peters
BY
Williams, Bradbury & Hinkle
Attorneys.

Nov. 1, 1949  C. R. PETERS  2,486,977
MACHINE TOOL
Filed Jan. 30, 1946  13 Sheets-Sheet 9

INVENTOR:
Charles R. Peters
BY Williams, Bradbury & Hinkle
Attorneys.

Nov. 1, 1949 C. R. PETERS 2,486,977
MACHINE TOOL
Filed Jan. 30, 1946 13 Sheets-Sheet 12

INVENTOR:
Charles R. Peters
BY Williams, Bradbury & Hinkle
Attorneys.

Nov. 1, 1949

C. R. PETERS 2,486,977

MACHINE TOOL

Filed Jan. 30, 1946

INVENTOR:
Charles R. Peters
BY Williams, Bradbury & Hinkle
Attorneys.

Patented Nov. 1, 1949

2,486,977

UNITED STATES PATENT OFFICE 2,486,977

MACHINE TOOL

Charles R. Peters, Richmond, Ind., assignor to National Automatic Tool Company, Inc., Richmond, Ind., a corporation of Indiana Application January 30, 1946, Serial No. 644,247

9 Claims. (Cl. 82—2)

My invention relates generally to machine tools, and more particularly to an improved machine tool for performing a variety of operations, such as facing, boring, and turning, either singly, or simultaneously.

It is an object of the invention to provide an improved machine tool for performing facing operations, in which the tools have a cross feed which is controllable independently of the speed at which the tools are rotated.

A further object is to provide an improved tool cross feeding mechanism.

A further object is to provide an improved planetary gearing for securing cross feed of tools for performing facing operations.

A further object is to provide an improved combined electric and hydraulic control mechanism for machine tools used in the performance of facing operations.

A further object is to provide an improved machine tool having a rotating head provided with radially movable cutting tools, and improved means for causing cross feed of the tools through a mechanism capable of being driven at variable speeds, so as to obtain a constant cutting speed.

Other objects will appear from the following description, reference being had to the accompanying drawings, in which:

Fig. 10a is a sectional view of the transfer valve showing it in a position rotated 90° with respect to its illustration in Fig. 10;

Figure 1:
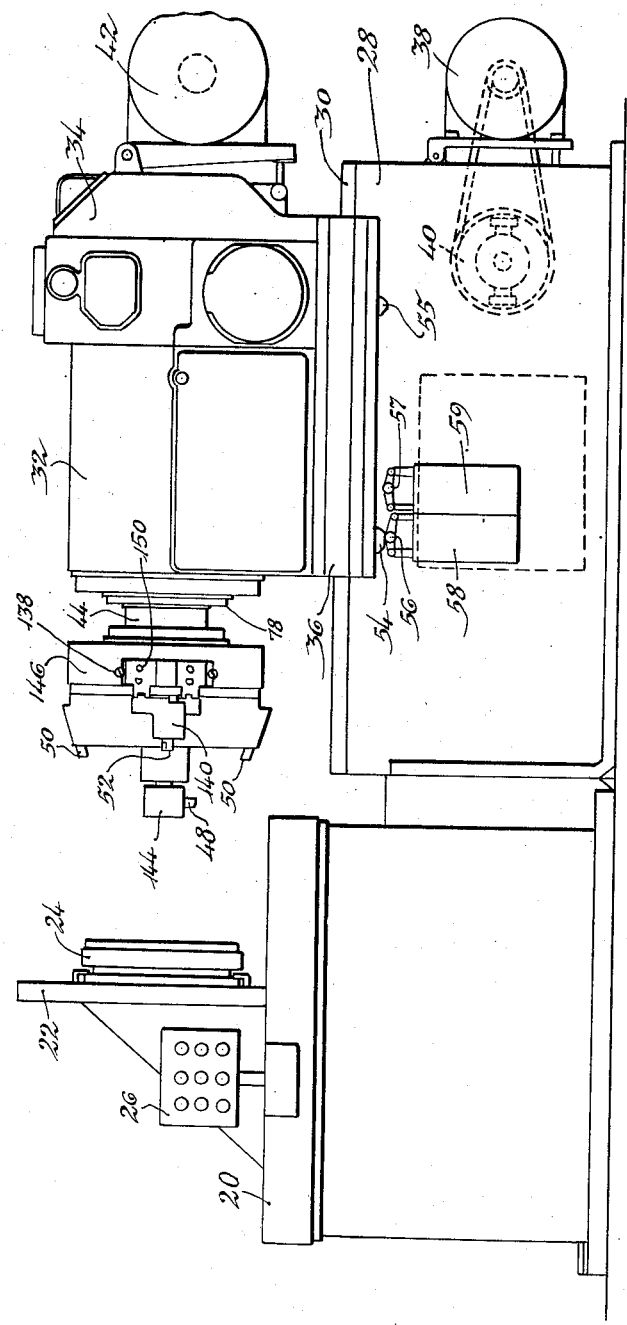
Fig. 1 is a side elevational view of the complete machine.

Referring to Fig. 1, the tool comprises a fixture base 20 supporting a suitably secured work holding fixture 22 to which a workpiece 24 is clamped. A push button panel 26 is secured to the base 20 in a position convenient for the operator observing the cutting operation.

An auxiliary bed 28 is bolted to the base 20 and has ways 30 thereon for adjustably supporting a spindle case 32 having a gear case 34 bolted thereto. Both the spindle case 32 and the gear case 34 are bolted to a saddle 36, which is provided with suitable means for stopping it in adjusted position on the ways 30. The movement of the assemblies 32, 34, and 36 upon the ways 30 is controlled by suitable hydraulic reciprocating motor in a conventional manner.

Suitably secured to the bed 28 is an electric motor 38 having a belt drive connection with a pump 40 for supplying the hydraulic fluid under pressure for the operation of the reciprocating hydraulic motor used to traverse the saddle 36 (and all parts carried thereby) back and forth on the ways 30.

Mounted upon the gear casing 34 is an electric motor 42 for driving the spindle 44 through a suitable train of gearing, hereinafter to be described. The spindle 44 has a head 46 fixed thereto and is provided with a boring tool 48, a pair of turning tool bits 50, and a pair of facing tools 52, as will appear more clearly hereinafter.

The saddle 36 is provided with suitable means to which one or more dogs 54, 55 may be secured in adjusted positions, these dogs cooperating respectively with rollers 56 and 57 for the operation of limit switches 58 and 59.

Figure 2:
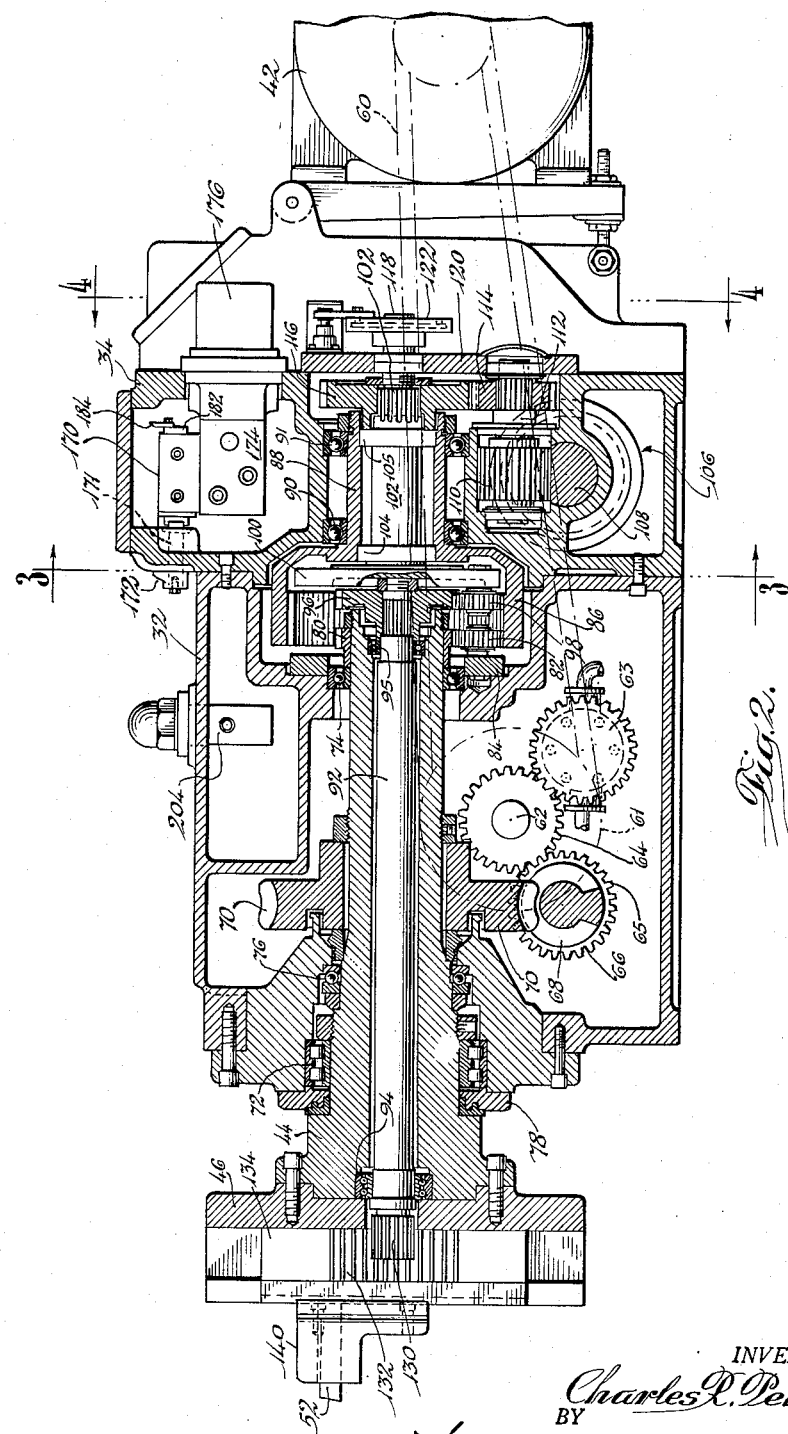
Fig. 2 is a central vertical sectional view of the tool head, its driving means, and the mechanism for causing cross feed of the tools.

Referring particularly to Fig. 2, the spindle driving motor 42, through a diagrammatically illustrated belt 60 and pulley 61, drives a shaft 62, and the latter, through suitable gears 64 and 65, drives a worm shaft 66 having a worm 68 formed thereon, the latter meshing with a worm gear 70 splined to the spindle 44. In addition to driving the worm gear 70, the gear 64 drives a rotary hydraulic pump 63, which provides the hydraulic fluid under pressure for operation of a hydraulic motor 106.

The spindle 44 is mounted in suitable anti-friction roller bearing assembly 72 and a ball-bearing assembly 74. A ballbearing assembly 76 is provided to take up the thrust on the spindle. A suitable labyrinth oil seal 78 is provided to retain the lubricant in the bearing assemblies 72 and 76.

Figure 3:
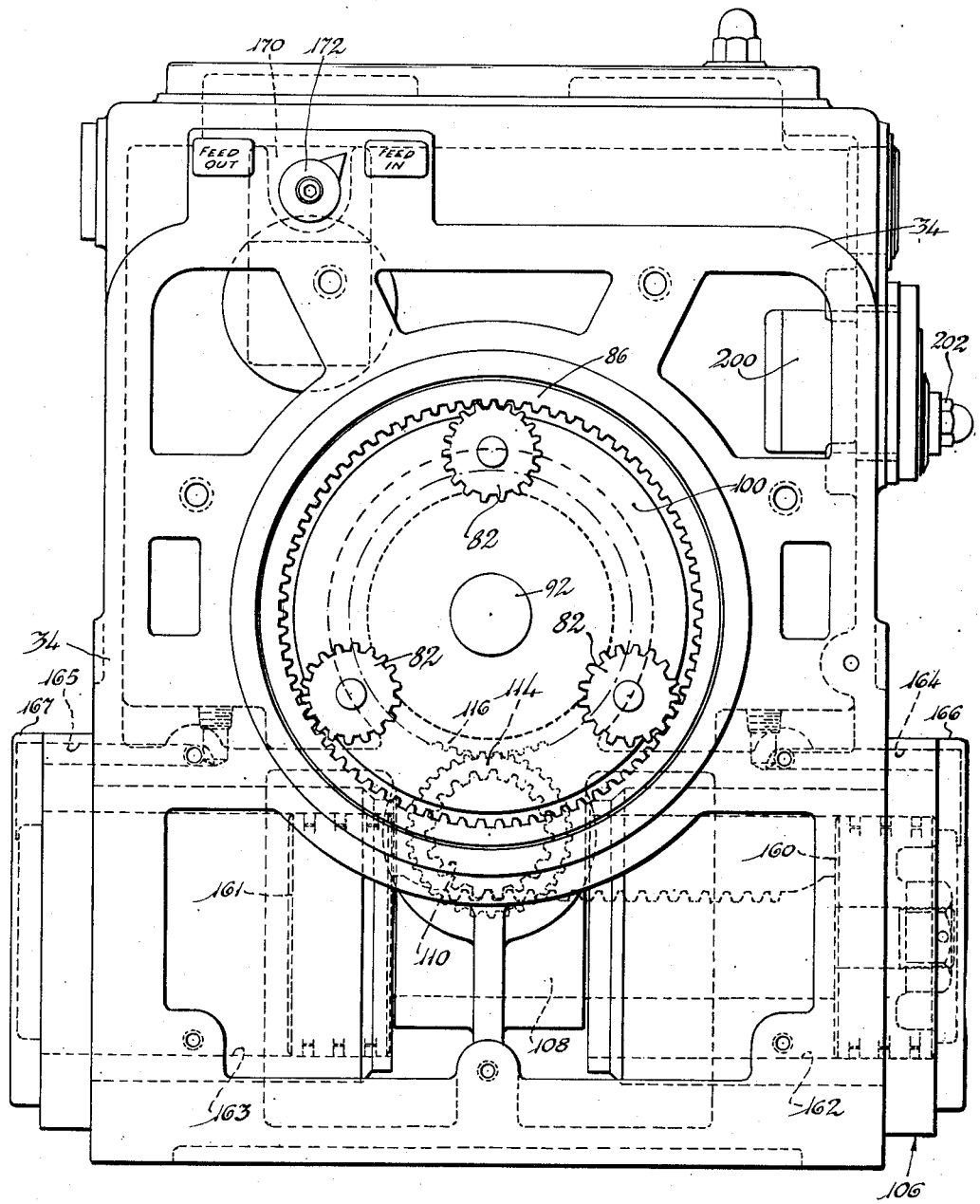
Fig. 3 is an end elevational view of the rear section gear box, taken substantially on the plane of the line 3—3 of Fig. 2.

A sun gear 80 is keyed to the inner end of the hollow spindle 44 and meshes with three planetary pinions 82 (only one shown in Fig. 2, but arranged as shown in Fig. 3), the pivot studs of which are secured to a fixed plate 84. The planetary pinions 82 mesh with a ring gear 86 having an elongated hollow hub 88 rotatable in suitable anti-friction bearings 90, 91. A cross feed shaft 92 is rotatably mounted within the spindle 44 in anti-friction bearings 94 and 95. A second sun gear 96 is keyed to the inner end of the cross feed shaft 92 and meshes with three planetary pinions 98, which are rotatable on studs secured to a flange 100 forming part of a shaft 102 journaled in the hub 88 through anti-friction bearings 104, 105.

The planetary pinions 98 mesh with the ring gear 86. The shaft 102 is adapted to be rotated by means of the hydraulic motor 106, the piston rod 108 of which has a rack formed thereon meshing with a pinion 110 formed integrally with a shaft 112, the latter having a pinion 114 splined thereto. Suitable anti-friction bearings are provided for the shaft 112.

The pinion 114 meshes with a gear 116 splined to the shaft 102. The shaft 102 has a portion 118 of reduced diameter extending through a mounting plate 120 and carrying a cycle control plate 122. The latter plate has a suitable circular T groove 124 (Fig. 4) milled therein for the reception of bolts 125 by which dogs 126 and 127 may be adjustably positioned about the circumference of the plate. As will hereinafter more fully appear, the dogs 126 and 127 are adapted to operate limit switches 128 and 129, respectively, which control the extent of radial inward and outward movement of the facing cutters 52.

Figure 8:
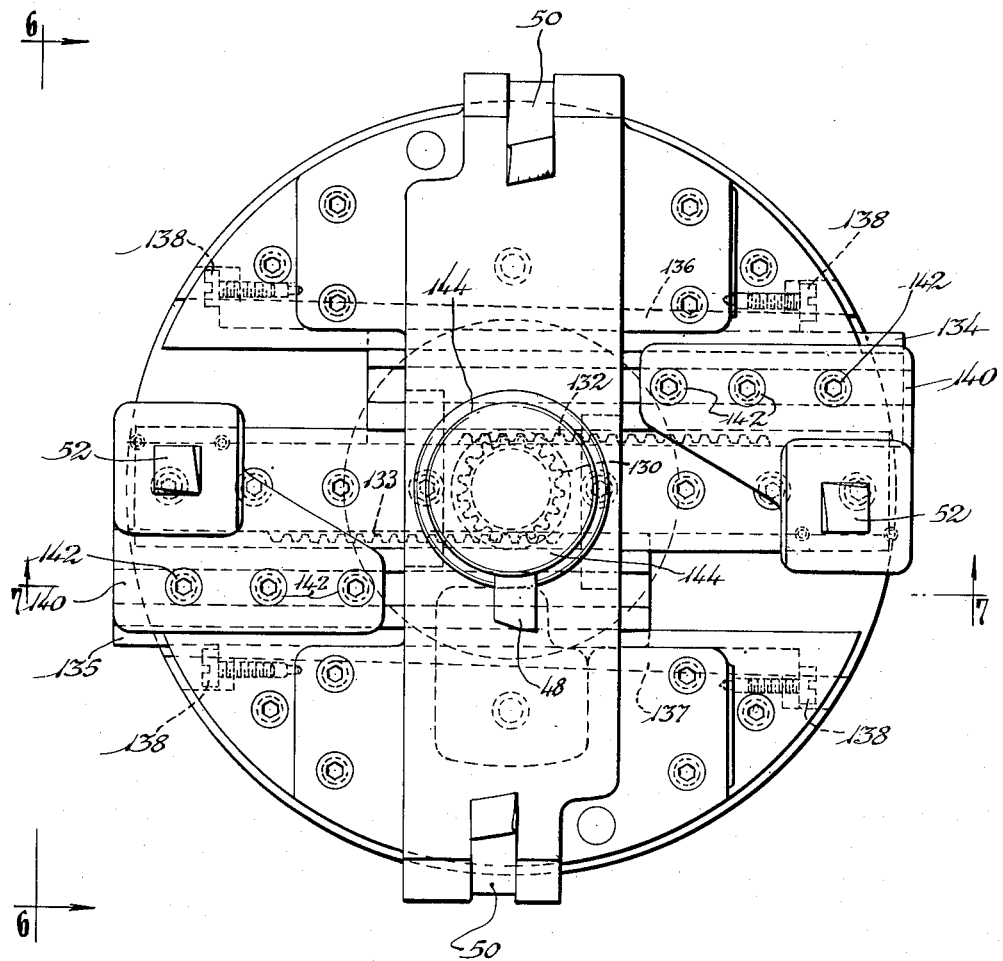
Fig. 8 is a front elevational view of the head.

The forward end of the shaft 92 has a pinion 130 (Fig. 2) formed thereon for engagement with a pair of racks 132, 133 formed on tool carrying slides 134 and 135, respectively (Fig. 8), the racks being slidable on adjustable tapered gibs 136 and 137, respectively, the gibs being locked in adjusted position by means of screws 138. Suitable bearings in addition to the gibs 136 and 137, are provided for guiding the slides. Each of the slides has a tool carrier 140 secured thereto by hollow head cap screws 142, and these carriers are formed for the reception of the cutting tools 52.

Figure 6:
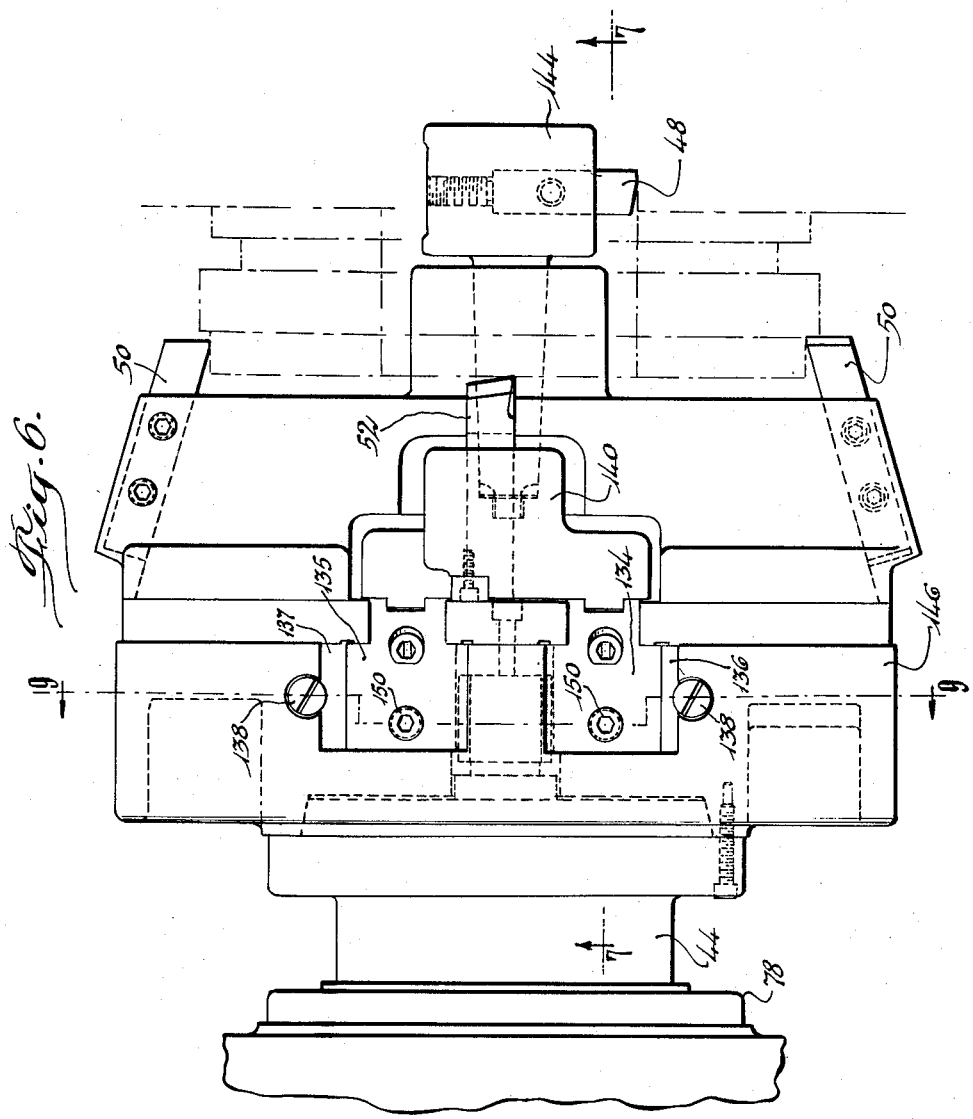
Fig. 6 is a plan view of the head.
Figure 7:
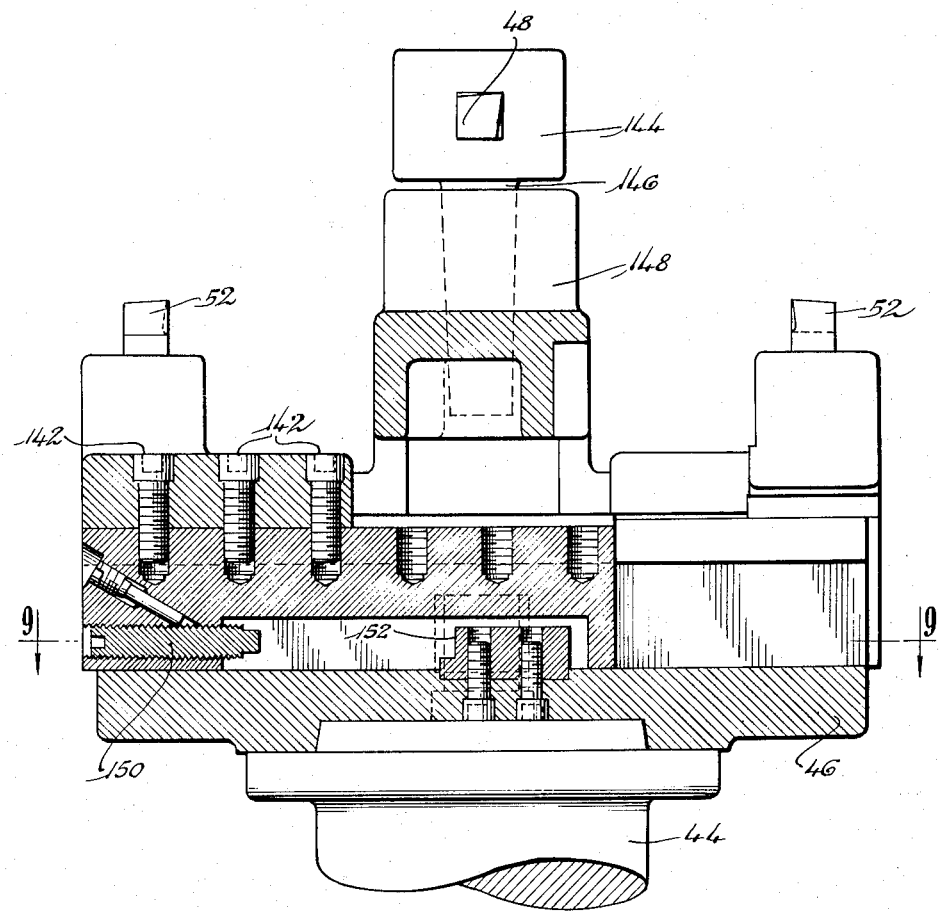
Fig. 7 is a fragmentary sectional view, taken on the line 7—7 of Fig. 6.

The boring tool 48 is secured in a carrier 144 (Figs. 6 and 7), the carrier 144 having a tapered tang shank 146 fitting in a suitable Morse tapered bore formed in a casting 148 which is secured to the head 46 and, depending upon the character of the operations to be performed upon the workpiece, may also be provided with means for supporting the turning tool bits 50.

Figure 9:
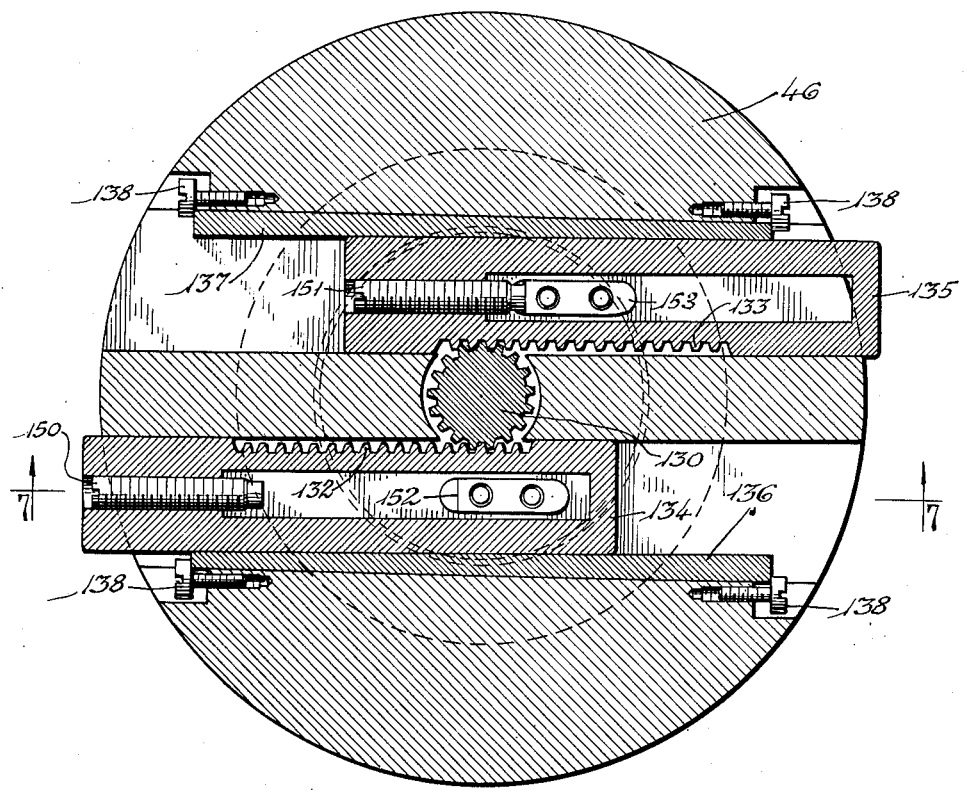
Fig. 9 is a sectional view, taken on the line 9—9 of Fig. 7.

In setting up the machine for performing a particular facing operation, the radial extent of cross feed of the slides 134, 135, is determined by the adjustment of stop screws 150 and 151 (Figs. 7 and 9), which are adapted to engage respectively stops 152 and 153. It will be noted that the inward cross feed movement of the slides 134, 135 is limited by the engagement of the screw 150 with its fixed stop 152, while outward movement of these slides is limited by the engagement of the end of the screw 151 with its stop block 153.

The piston rod 108 (previously referred to in connection with Fig. 2), which forms part of the hydraulic motor 106, is shown in dotted lines in Fig. 3. The hydraulic motor 106 has a pair of pistons 160, 161 secured to the ends of the piston rod 108. The operating hydraulic fluid is alternately supplied to the opposite ends of the cylinders 162 and 163, in which the pistons 160 and 161 are fitted, such supply being through suitable passageways 164 and 165 formed in the gear casing 34, the flanges of the cylinders 162, 163, and the cylinder heads 166, 167.

Figure 4:
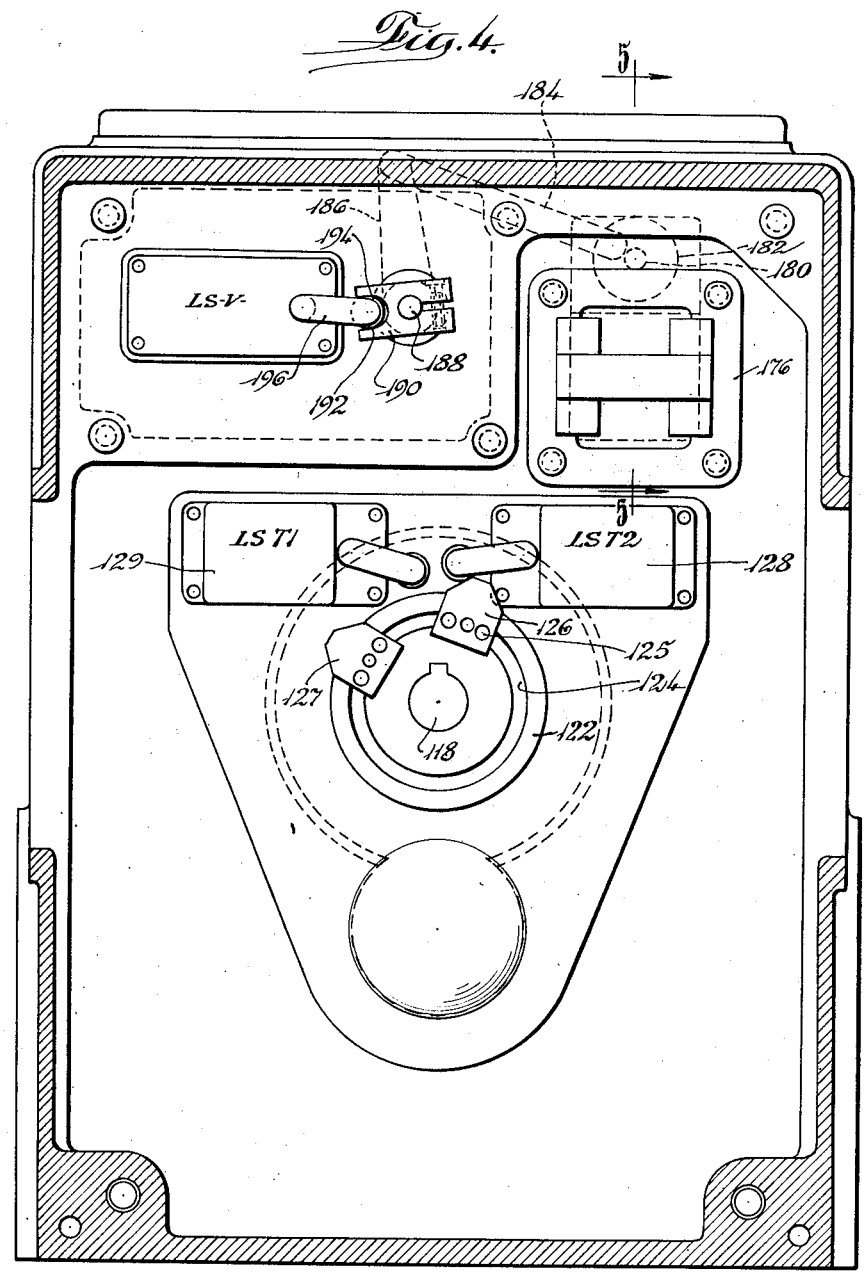
Fig. 4 is a vertical sectional view, taken on the line 4—4 of Fig. 2.
Figure 5:
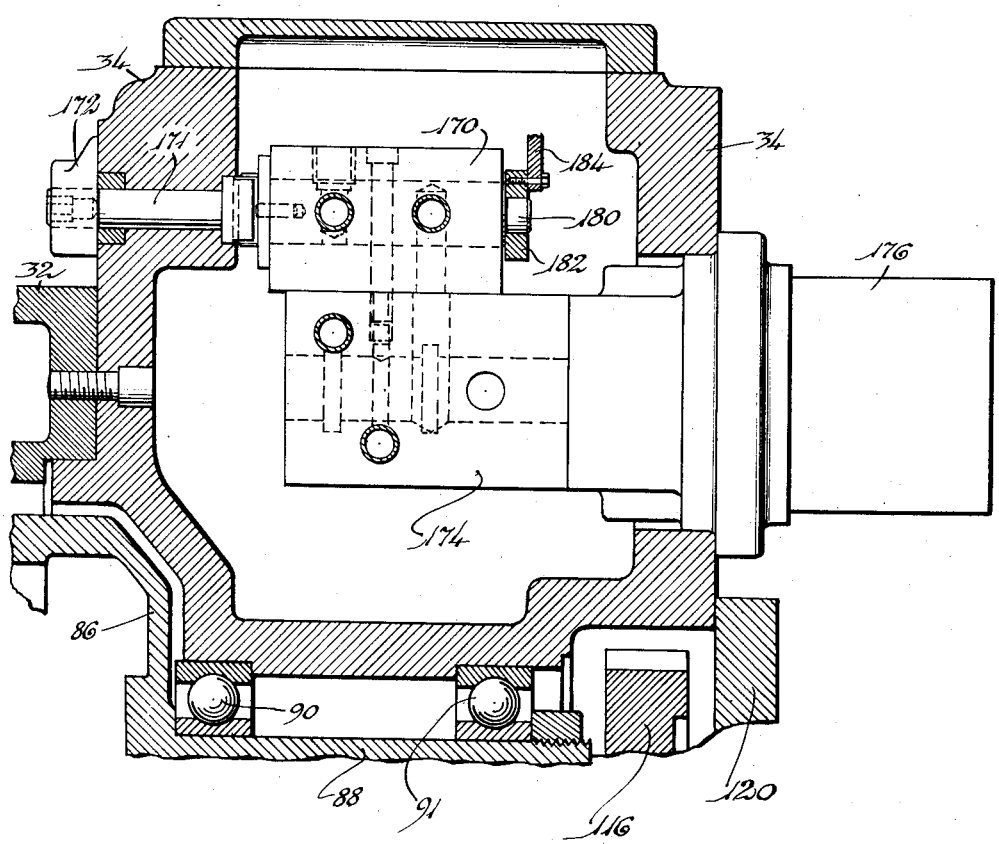
Fig. 5 is a fragmentary sectional view, taken on the line 5—5 of Fig. 4.

Mounted upon the upper forward portion of the gear casing 34 is a transfer valve 170 (Fig. 5) having an operating shaft 171 to which an operating knob 172 is secured. The transfer valve body 170 is secured to a directional valve 174 which is adapted to be operated by a solenoid 176 in one direction, and by a spring 178 (Fig. 10) in the other direction. The transfer valve stem 180 has a disc 182 secured thereto (Figs. 4 and 5). Pivotally secured to the disc 182 is a link 184, the other end of which is pivotally secured to an arm 186 which is fixed to a rotatably mounted shaft 188 (Fig. 4). Suitably clamped to the shaft 188 is a yoke 190 having an open end slot 192 for engagement with a roller 194 mounted at the end of an actuating arm 196 of a limit switch LS—V.

Also mounted in the casing 134 is a feed control unit 200 (Fig. 3) which may be manually set by a knob 202 to determine the rate of cross feed. Also mounted on the gearing casing 34 is a pressure controlling relief valve 204 (Fig. 2).

Figure 10:
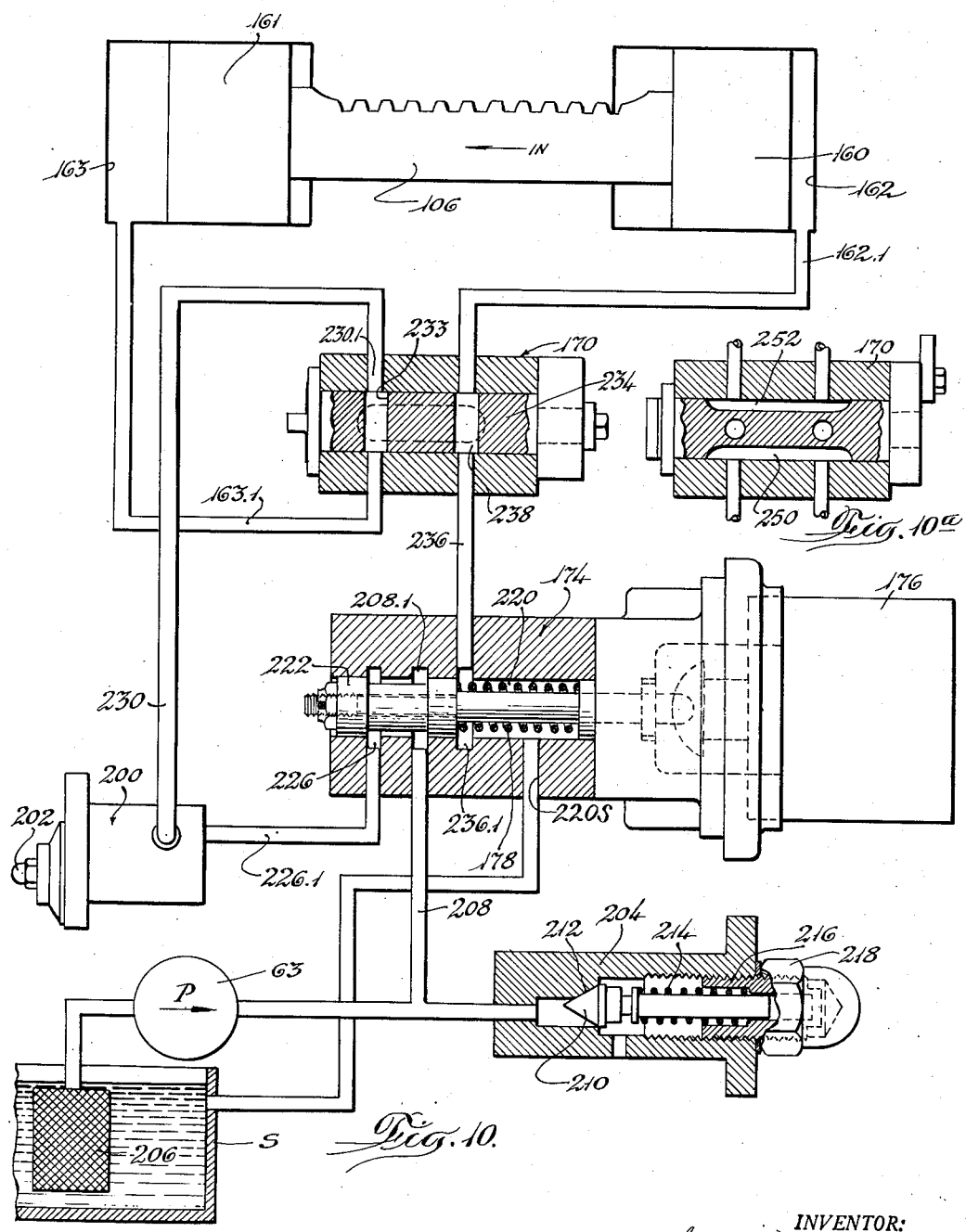
Fig. 10 is a diagram, showing the hydraulic controls in the positions assumed during different portions of the operating cycle.

The hydraulic circuits and components thereof are shown in their normal positions in Fig. 10. In this figure, it will be noted that the hydraulic operating fluid, such as oil, is drawn from a sump S through a filter 206 by the rotary pump 63 to a conduit 208, the pressure in which is controlled by the relief valve 204. This valve comprises a conical valve part 210 engaging an eccentrically ground seat 212. The valve part 210 is urged into engagement with its seat by a spring 214, the degree of compression of which may be adjusted by means of a sleeve 216 threaded into the valve body. An acorn nut 218 locks the sleeve 216 in adjusted position. The conduit 208 leads to an annulus 208.1 formed in the directional valve 174. This valve 174 has a bore 220 in which a spool valve 222 is reciprocable, the valve being normally urged toward the position in which it is shown in Fig. 10 by the compression coil spring 178, and being moved in the opposite direction by the solenoid 176.

Figure 12:
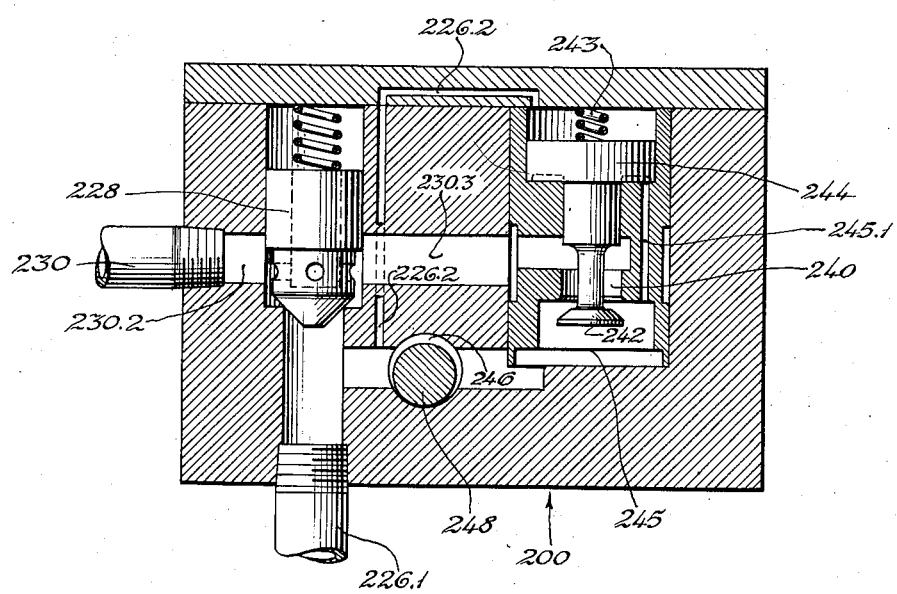
Fig. 12 is a sectional view of the feed control unit.

The spool valve 222, when in the position shown in Fig. 10, connects the annulus 208.1 with an annulus 226 having a conduit 226.1 connected thereto. The conduit 226.1 leads to the feed control valve 200 (Figs. 10 and 12). This valve comprises a check valve 228 which permits free flow from the conduit 226.1. After passing the check valve 228, the oil may flow freely into a conduit 230 which leads to a port 230.1 in the transfer valve 170. When this valve is in the position shown in Fig. 10, the machine is in normal position, that is, the facing tools 52 are in their outermost position with the end of the adjusting screw 151 in engagement with its stop 153. Under these circumstances, the oil from port 230.1 flows through a cross drilled hole 233 formed in the rotatable valve part 234 and into a conduit 163.1 leading to the left-hand end of the cylinder 163, thereby applying pressure to the piston 160 in a direction to hold the facing tools in the above described position. Under these circumstances, the right-hand end of cylinder 162 is connected by conduit 162.1 which communicates with a conduit 236 through a cross drilled hole 238 formed in the rotatable valve part 234. The conduit 236 communicates with an annulus 236.1 formed in the body of the directional valve 174, from which the oil escapes to the sump through an outlet 220S.

Figure 11:
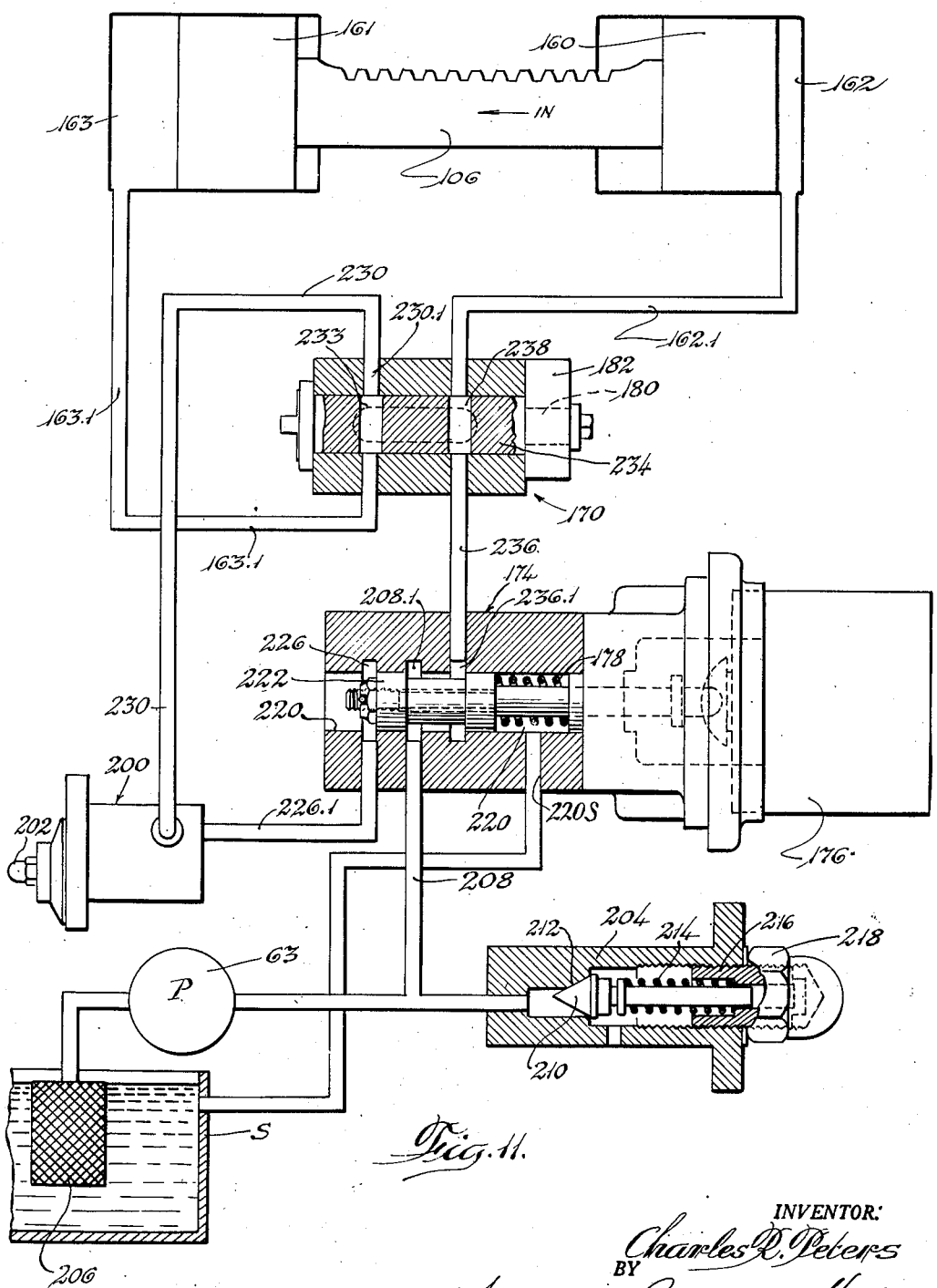
Fig. 11 is a diagram of the hydraulic controls in the position assumed during feeding inward of the cross feed facing tools.

Upon initiation of a machine operation, the solenoid 176 is energized (as will more clearly appear hereinafter), thereby moving the directional valve from the position in which it is shown in Fig. 10 to the position in which it is shown in Fig. 11. Under these circumstances, it will be clear that the discharge of the pump 63 is free to flow from the annulus 208.1 to the annulus 236.1, conduit 236, cross drilled hole 238, and conduit 162.1 to the right-hand end of cylinder 162, thereby tending to move the pistons 160 and 161 to the left. The oil in the left-hand end of cylinder 163 flows through conduit 163.1, cross drilled hole 233, and conduit 230, to the differential governor valve inlet port 230.2, passageway 230.3, and to a chamber 245 through port 240, the opening of which is controlled by a valve 242. The position of the valve 242 is determined by the pressure upon opposite sides of a piston 244 and by a spring 243 which exerts a force equivalent to about 25 p. s. i. on the piston 244. The lower annular face of the piston 244 is subjected to the oil pressure in the chamber 245 by way of a duct 245.1. The oil above the upper face of the piston may escape through a duct 226.2 to the conduit 226.1. The valve 242 and piston 244 thus maintain a constant differential pressure across an adjustable aperture 246 formed in a rotatable valve part 248, the position of which is determined by adjustment of the knob 202. The flow through the aperture 246 is thus at a constant rate.

After passing through the adjustable aperture 246, the oil may escape to the sump through conduit 226.1, annulus 226, and the end of the bore 220. Thus when the parts are in the position shown in Fig. 11, the pistons 160 and 161 will move to the left to feed the facing tools 52 radially inwardly at a uniform feed rate controlled by the adjustment of the size of the aperture 246 in the feed control valve 200.

When the tools have fed inwardly to the desired extent, the limit switch LST1 is operated by the cam 127 and through electrical circuits controlled by this switch the solenoid 176 is deenergized to permit the spring 178 to move the directional spool valve 222 to its left-hand position as shown in Fig. 10. When in this position, the oil under pressure may flow to the left-hand end of the cylinder 163 and oil may escape freely from the right-hand end of the cylinder 162, as previously described, thereby to cause rapid outward movement of the facing tools 52.

When the transfer valve 170 is shifted through an angle of 90°, as shown in Fig. 10a, it connects conduits 236 and 163.1 by way of a longitudinal groove 250 and connects conduits 162.1 and 230 by a similar longitudinal groove 252. Under these conditions the connections to the ends of the cylinders 162, 163 are in effect reversed, so that the tools will feed outwardly at a rate controlled by the adjustable aperture 246, and will be returned inwardly rapidly due to the free flow of the hydraulic fluid past the check valve 228. Thus, depending upon the character of the workpiece, the tools may be caused to feed toward the center or away from the center, merely by changing the position of the transfer valve 170.

The hydraulic reciprocatory motor by which the saddle 36 and parts carried thereby are moved toward and away from the work, is controlled by conventional valve mechanisms under the control of the limit switches 58 and 59 operated by the dogs 54, 55. Such combined hydraulic and electrical control is more fully disclosed in the copending application of Robert A. Schafer, et al., Serial No. 518,366, filed January 15, 1944, now Patent No. 2,408,957, granted October 8, 1946.

The control circuits for the operation of the machine are shown diagrammatically in Fig. 13, and these circuits will be described in conjunction with the description of the various operating cycles which may be performed by the machine tool.

The various motors embodied in the machine may be started individually or simultaneously. Assuming that they are to be started individually, operation selector switch 260 is operated to a position opposite to which it is shown in Fig. 13. Thereupon, upon momentary depression of a stop and undervoltage reset switch 266, a circuit is completed from line conductor L3 through switch 260, operated switch 266, to conductor 268, through an undervoltage relay UV, to the other line conductor L1. Energization of the relay UV results in closing contacts UV—1 so that the conductor 268 is then connected to the line L3, through a circuit including switch 260, conductor 269, and contacts UV—1.

Thereafter, the various motors may be selectively started. Upon manual operation of the switch 261 from the position in which it is shown in Fig. 13, a circuit to the starting mechanism H1 of the head motor 42 is completed, this circuit being traced as follows: From line L3, through switch 260 (in its upper position), conductor 269, contacts UV—1, conductor 268, switch 261 (in its upper position), motor starting mechanism H1, overload relay contacts OL—1, to line L1.

Figure 13:
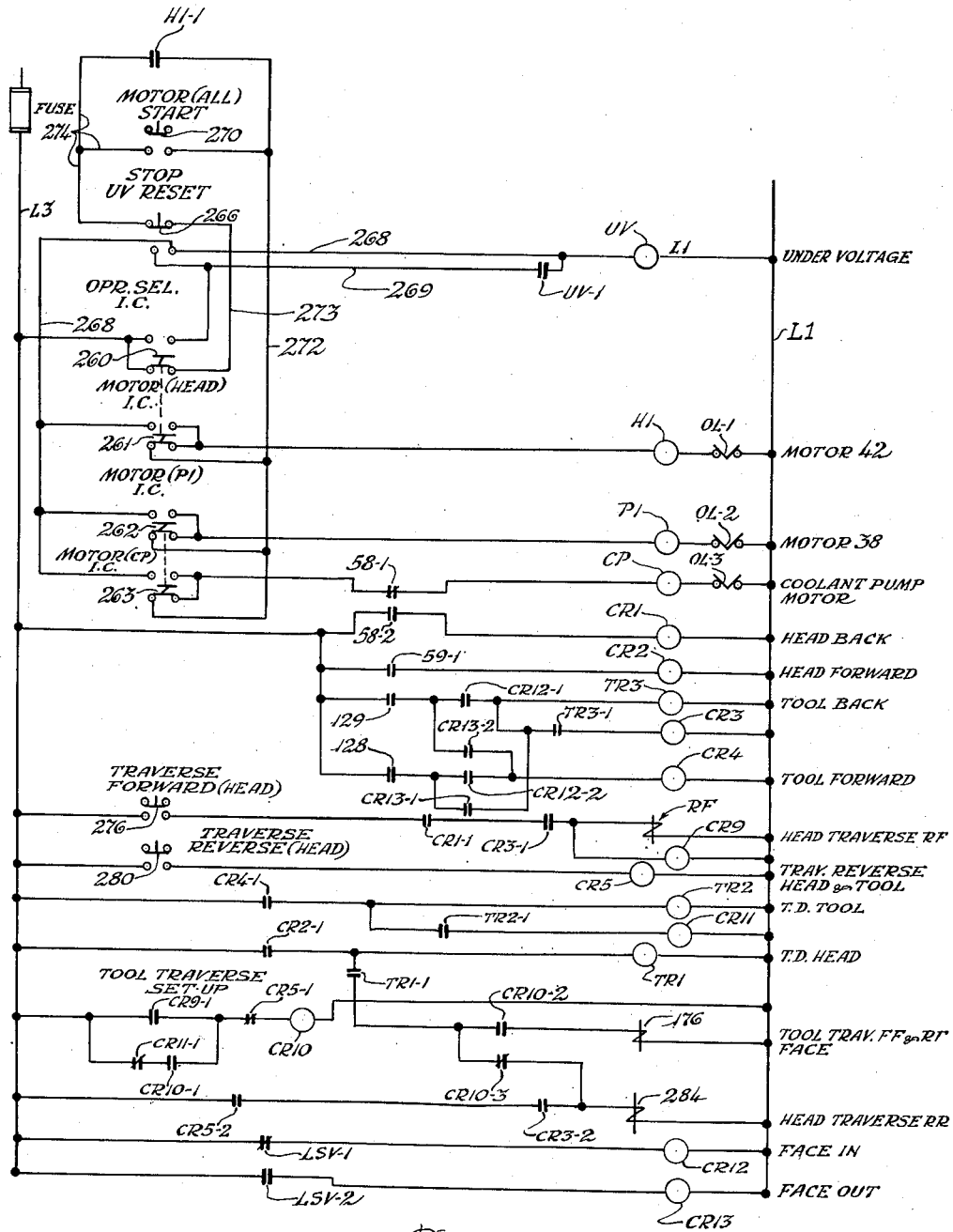
Fig. 13 is a schematic diagram showing the electric controls and circuits.

To energize the starting mechanism P1 for the hydraulic pump driving motor 38, the switch 262 is moved upwardly from the position shown in Fig. 13, thereby completing a circuit from the conductor 268 which, as previously described, is connected to conductor L3 through switch 262, starting mechanism P1, overload relay contacts OL—2, to line conductor L1. Similarly, the motor for driving the cooling pump (not shown) has its starting mechanism CP potentially energized by operating the switch 263 to its upper position, thus partially completing a circuit from the line conductor L3 to the previously described switches and conductors to the conductor 268, switch 263, switch contacts 58—1 (which are closed after the head moves from its back position), cooling pump starting mechanism CP, and overload relay contacts OL—3, to line L1.

The undervoltage relay UV will remain energized and maintain the motor energizing circuits until an undervoltage or current interruption condition obtains, whereupon deenergization of the relay UV, through opening of its contacts UV—1 will deenergize all the motor starting circuits. To reestablish these circuits after such undervoltage condition has passed, the Stop UV Reset switch 266 is operated to connect conductors 268 and 269 and thus temporarily provide a shunt path around contacts UV—1. This will reenergize UV, close UV—1, and recomplete the previously described motor starting circuits.

When it is desired to start all of the motors simultaneously, the operation selector switch 260 is maintained in the position in which it is shown in Fig. 13. Under these conditions, operation of a motor starting switch 270 will result in connecting conductor L3 to a conductor 272 through the following conductors and switches: From L3, switch 260, conductor 273, switch 266, conductor 274, switch 270, and conductor 272. It will be clear that under these circumstances the motor starters H1 and P1 will be simultaneously energized and the circuit for the coolant pump starter will be in condition to be completed by the closure of contactor 58—1 of the limit switch 58.

When the motor starter H1 is energized, it closes contacts H1—1, establishing a holding circuit across the "Start" switch 270 so that when the push button for the latter is released, the motor starting circuits will remain completed.

The operation of the control circuits will now be described with reference to an operating cycle in which the machine is to perform a facing operation upon the workpiece 24, feeding inwardly toward the center of the work. To accomplish this, the machine must go through the following operating cycle: (1) Rapid forward traverse of saddle 36 and all parts carried thereby; (2) feed of the saddle 36 and head for performing the boring and turning operations; (3) stopping the forward feed of the head; (4) feeding the facing tools 52 toward center to a positive stop; (5) dwell of the facing tools against their positive stop; (6) rapid reverse traverse of the facing tools and of the head; (7) stop rapid reverse traverse of the facing tools against positive stop; (8) stop head in back position.

To perform the above described operating cycle, the motors are started either independently or simultaneously as above described. The transfer valve 170 is moved by its knob 172 to "Feed in" position. Through the disc 182 (Figs. 4 and 5), link 184, arm 186, and shaft 188, clamp 190, and arm 106, the limit switch LSV is operated, thereby closing contacts LSV—1 (Fig. 13) and opening contacts LSV—2. Closing LSV—1 results in energization of control relay CR12, the circuit therefor being directly from line conductor L3, LSV—1, CR12, to L1. Energization of CR12 results in closing contacts CR12—1 and CR12—2, thereby interlocking the forward and reverse traverse circuits of the unit. Also before the unit can be traversed, the forward dog 54 (Fig. 1) must be in contact with limit switch 58 to close its contactor 58—2, which completes a circuit through control relay CR1. Energization of relay CR1 closes its contacts CR1—1, an interlock switch in the circuit for the rapid forward traverse solenoid RF. In addition, before the unit can be traversed forward, the facing tools must be in their back or outward position. In this position the dog 127 (Fig. 4) contacts limit switch 129, closing the same and completing a circuit through a time relay TR3, through the then closed contact CR12—1.

After a predetermined time, controlled by the time relay TR3, the latter operates to close its contacts TR3—1, which completes a circuit through control relay CR3. Energization of CR3 closes its contacts CR3—1, interlocking the circuit for the forward solenoid RF. To commence the forward traverse operation, the forward traverse push button is operated to close switch 276, which completes the circuit to the forward solenoid RF. Energization of solenoid RF operates the usual hydraulic control valve for effecting rapid forward traverse of the saddle 36 and head carried thereby.

Closing traverse forward switch 276 also energizes relay CR9 through the following circuit: From L3, through switch 276, contact CR—1, contact CR3—1, and CR9, to L1. A normally open contact CR9—1 of relay CR9 thereupon closes and completes a circuit through control relay CR10, this circuit being traced as follows: From LR3, through CR9—1, closed contacts CR5—1 and CR10, to L1. It will be noted that CR5 is energized only when it is desired to reverse the traverse of the unit by contacting the reverse traverse push button and closing its switch 280, the switch 280 and CR5 being in series circuit directly across the lines L3 to L1.

Energization of CR10 closes contact CR10—1 and completes a holding circuit for CR10. This circuit is traced as follows: From L3 through normally closed contacts CR11—1, now closed contact CR10—1, normally closed contact CR5—1, and CR10, to L1. Energization of CR10 results in closure of its contacts CR10—2 in the circuit of solenoid 176, which operates valve 222.

As the saddle 36 moves to a position in which the boring tool 48 and the turning tool 50 are about to engage the workpiece 24, a suitable cam positioned on the saddle 36, operates upon the hydraulic control for the hydraulic motor which moves the saddle 36, to cause the saddle to move forwardly at a desired feed rate. This feeding portion of the cycle continues until the forward movement of the saddle is arrested by a positive stop, at which time the dog 55 will engage the roller 57 to operate limit switch 59, thereby closing its contactor 59—1. Closure of the latter will result in energization of a control relay CR2, the energization of the latter through closure of its contacts CR2—1 completing a circuit to energize time delay relay TR1.

After a suitable short time interval subsequent to the energization of TR1, its contacts TR1—1 are closed, completing an energizing circuit for solenoid 176, which may be traced as follows: Line L3, contactors CR2—1, TR1—1, CR10—2, and solenoid 176, to L1. The solenoid 176 shifts valve 222 from the position in which it is shown in Fig. 10 to the position in which it is shown in Fig. 11, thereby causing the hydraulic actuating fluid to flow into the cylinder 162 and permit flow from the cylinder 163 at a rate controlled by the feed control device 200, more particularly by the adjustable aperture valve 248. As a result, the hydraulic motor which includes the pistons 160 and 161, operates through their connecting rack 106 and through the planetary gearing shown in Fig. 2, to cause inward feed of the facing tools 52.

When the facing tools 52 complete the facing operation, dog 126 (Fig. 4) closes limit switch 128 and completes a circuit to energize control relay CR4, this circuit being traced from line L3, limit switch 128, CR12—2, CR4, to L1.

Energization of CR4 closes its contacts CR4—1 to energize time delay relay TR2, which are in series between the lines L3 and L1. This permits the facing tools to dwell at the end of the facing operation. At the end of the predetermined time delay of the time relay TR2, the latter operates closing its contacts TR2—1 to complete a circuit through control relay CR11. The normally closed contacts CR11—1 are thereby opened, and thus deenergize CR10, since contacts CR11—1 are in the holding circuit for CR10. Deenergization of CR10 results in reclosure of its contacts CR10—3 to complete a circuit as follows: From L3, through CR2—1, TR1—1, CR10—3, and rapid reverse solenoid 284, which operates on the hydraulic control for traversing the saddle 36 to initiate rapid reverse traverse of the saddle and head. Deenergization of CR10 also results in opening contacts CR10—2, thereby deenergizing the solenoid 176, permitting the spring 178 to move the valve 222 from the position in which it is shown in Fig. 11 to the position in which it is shown in Fig. 10, with the result that hydraulic fluid from the pump 163 flows from conduit 208 to conduit 226.1 around the spool valve 222 and past check valve 228 (Fig. 12), through conduit 230 and passageway 233 to the cylinder 163. Since under these conditions the hydraulic fluid may escape freely from the cylinder 162, the piston 160, 161 will move rapidly to the right (Figs. 10 and 11) and through the planetary gearing shown in Fig. 2, to cause the facing tools 52 to move rapidly radially outward. The facing tools thus reverse to the starting position and the head continues rapid reverse traverse until a mechanical dog moves the hydraulic valve of the head traversing hydraulic system to stop position.

When the facing tools reach the starting position, the dog 27 closes limit switch 129, and thereby completes a circuit traced from L3, switch 129, CR12—1, time delay relay TR3, to L1. Energization of TR3, after a suitable time, closes its contacts CR3—1 in the forward traverse circuit interlocks the unit or head traverse in condition for commencement of a new cycle, if and when the push button switch 276 is again closed. The cycle of operation in which the facing tools feed inward is thus completed.

When the particular workpiece requires that the facing tools face the work from the center outwardly, it is necessary to move the directional selector or transfer valve 170 by means of its knob 172 (Fig. 3) to "Feed out" position. The valve plug 234 of the transfer valve is therefore moved to the position in which it is shown in Fig 10a, and in moving to this position it operates limit switch LSV through the linkage shown in Fig. 4, to open LSV—1 and close LSV—2. Closure of LSV—2 results in energization of control relay CR13.

The motors may then be started either simultaneously or independently as above described. Before the head unit can start forward, it must be in back position with dog 54 in engagement with roller 56 of limit switch 58, which interlocks the forward traverse of the unit. With the head motor 42 running, the hydraulic pump 63 is in operation so that when the direction selector valve 170 is in "Feed out" position and the solenoid 176 deenergized, the facing tools are traversed rapidly toward the center of the work, since oil from the pump 63 flows rapidly (Fig. 10) through conduit 208 past spool valve 222, conduit 226.1, check valve 228, conduit 230, groove 252, and conduit 162.1, to cylinder 162. At the same time, oil is freely discharged from the cylinder 163 through conduit 163.1, groove 250 of valve plug 234, conduit 236, to bore 220 and passageway 220S.

When the facing tools 52 abut against their inward stop, dog 126 (Fig. 4) operates limit switch 128. Closure of limit switch 128 results in energization of time delay relay TR3 through a circuit traced as follows: From L3, switch 128, closed contacts CR13—1, time relay TR3, to L1. After a predetermined time delay which allows the tools, as a safety measure, to dwell at their center position, before the head unit is started forward, TR3 operates and closes its contacts TR3—1, to energize control relay CR3, through a circuit traced as follows: L3, switch 128, CR3—1, TR3—1 and CR3, to L1. Energization of CR3 closes CR3—1, interlocking the forward traverse circuit for the head with the facing tool traverse.

The forward traverse of the head unit may then be initiated by closure of the forward traverse push button switch 276, as previously described.

When the boring and turning operations have been completed, limit switch 59 is closed, thereby energizing CR2. CR2 through its closure of contacts CR2—1, energizes time relay TR1. After a predetermined time delay, contacts TR1—1 thereof are closed to energize solenoid 176, which moves the spool valve 222 from the position shown in Fig. 10 to the position shown in Fig. 11.

Bearing in mind that the transfer valve 170 will be in the position in which it is shown in Fig. 10a, it will be apparent from Fig. 11 that under these conditions the facing tools will feed outwardly at a feed rate determined by the position of the facing feed control 200, more particularly, by the position of the adjustable aperture valve 248. When the facing tools complete the facing operation, limit switch 129 is closed by its dog 127 and energizes CR4 through a circuit traced as follows: L3, switch 129, CR13—2, CR4, to L1. Energization of CR4, through closure of its contacts CR4—1, completes a circuit to time relay TR2. After a time delay which allows the facing tools to dwell a safe period of time before the head unit reverses, this relay operates to close its contacts TR2—1 and thereby energizes CR11. The normally closed contacts CR11—1 of the latter relay open the energizing circuit for CR10.

Deenergization of CR10 through its normally closed contacts CR10—3, completes a circuit through the head rapid reverse solenoid 284 to cause the head to commence rapid reverse traverse. This latter circuit is traced from L3, CR2—1, TR1—1, CR10—3, solenoid 284, to L1.

The solenoid 284 operates the valve of the hydraulic control for the head traverse in a direction to cause rapid reverse traverse of the head. Deenergization of CR10, through opening its contacts CR10—2, deenergizes the solenoid 176, allowing the facing tool traverse valve 222 to return to the position in which it is shown in Fig. 10, under the influence of its spring 178. As a result, the facing tools 52 move rapidly inwardly toward their center position in which position the limit switch 128 is closed by dog 126, and time relay TR3 is reenergized through the circuit L3, 128, CR13—1, and TR3. After the time delay of TR3, this relay operates to close its contacts TR3—1, which results in energization of CR3. Resultant closure of contacts CR3—1 interlocks the circuit for the rapid forward traverse of the unit, including solenoid RF, so that a next cycle may be started upon depression of the forward traverse push button switch 276, thereby conditioning the machine tool for a new cycle.

The unit may be reversed at any time by operating the traverse reverse push button to close switch 280. Closure of this switch energizes relay CR5 which is in series with switch 280 between L3 and L1. A normally closed contact CR5—1 deenergizes CR10. Contacts CR5—2 in the circuit of rapid reverse solenoid 284 are closed. Control relay CR10 being deenergized, opens its normally closed contacts CR10—3 and deenergizes the forward face solenoid 176, thereby reversing the traverse of the facing tools 52. When the tools reach their back position, assuming the direction selector valve 170 to be in "Feed in" position, the limit switch 129 is closed to energize time relay TR3. After suitable delay, its contacts TR3—1 are closed to energize CR3.

Energization of control relay CR3 through closure of its contacts CR3—2, completes a circuit to the rapid reverse traverse solenoid 284 which is traced as follows: From L3, CR5—2, CR3—2, 284, to L1. The solenoid 284 operates the hydraulic system of the head unit to cause the unit to operate in rapid reverse traverse to its stop position. Thus the operator may, in the event of any difficulty or failure of the tools to cut properly, by closure of the switch 280, cause the head promptly to move in rapid reverse traverse away from the work.

It is desirable to shut off the supply of coolant when the head is in back position, and to start the coolant pump as soon as the head leaves the back position. This is accomplished by the opening of the contacts 58—1 of the limit switch 58, when the head is in back position, and closing these contacts as soon as the head leaves the back position. Since the contacts 58—1 are in series with the coolant pump motor starter CP, it will be apparent that this control of the coolant pump will be effective whether the motors are independently started or whether they are operating by central control.

From the foregoing, it will appear that the machine tool is readily adapted to perform a plurality of operations simultaneously and in succession upon a workpiece, such operations as boring, turning, facing, chamfering, and the like, being readily performed. The control is such that the tool will perform automatically the various operations required. It is clear that the feed rate of the facing tools is independent of their speed of rotation, so that any desired feed rate may be obtained to secure any desired depth of cut and degree of finish. In some instances, one of the facing tools 52 will be arranged for taking a rough cut, while the other tool will be adjusted to obtain a finishing cut.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a machine tool for performing facing operations, a base, carriage mounted for horizontal movement on said base, motor means for moving said carriage back and forth on said base, a head rotatably mounted on said carriage, a cutting tool mounted for radial movement with respect to said head, a drive pinion for moving said tool substantially radially with respect to the head, means normally rotating the head and pinion at the same speed in the same direction, said last named means including a planetary gearing having a normally stationary part, means to move said normally stationary part forwardly and rearwardly at predetermined rates thereby to cause said pinion to move the tool to and fro substantially radially with respect to the head, electrohydraulic means coordinating the operation of the carriage moving motor and the means for moving the normally stationary part of the planetary gearing, and means fixed to the base for carrying a workpiece to be engaged by the tool.

2. The combination set forth in claim 1, in which the head is secured to the end of a hollow spindle, and in which said pinion is secured to a shaft extending through the spindle.

3. In a machine tool for performing facing operations, a rotatable spindle having a head, guides on said head, a pair of tool carrying slides mounted for reciprocation on said guides, said slides having facing rack teeth formed thereon, a pinion engageable with the rack teeth in both of said slides, means including a planetary gear train for rotating said spindle and said pinion in the same direction and normally at the same speed, a tool feed controlling motor, and means operated by said motor for moving a normally stationary element of said planetary gearing, thereby to rotate said pinion relative to said spindle and cause movement of said tool carrying slides relative to said head.

4. The combination set forth in claim 3, in which said motor comprises a reciprocable hydraulic motor having hydraulic control means associated therewith to cause movement thereof at predetermined speeds.

5. The combination set forth in claim 3, in which said motor means comprises a reciprocable hydraulic motor, hydraulic control means for said motor, and electrical control means for said hydraulic control means.

6. In a machine tool having a base, a carriage mounted for sliding movement on the base, a workpiece carrying fixture mounted rigidly with respect to the base, control means for causing reciprocation of the carriage on the base predetermined distances at predetermined rates, a hollow spindle having its axis extending in the direction of movement of the carriage and mounted for rotation therein, a tool carrying head secured to the end of the spindle, means for rigidly securing cutting tools to the head, a tool mounted for substantially radial movement on the head, actuating means for the tool extending through the spindle and normally rotating therewith, and means including planetary gearing for relatively moving said actuating means and said spindle to cause the radially movable tool to move inwardly and outwardly at predetermined rates and at predetermined times with respect to the movement of the carriage.

7. In a machine tool for performing facing operations, a rotatable spindle having a head, guides on said head, a pair of tool carrying slides mounted for reciprocation on said guides, said slides having facing rack teeth formed thereon, a pinion engageable with the rack teeth in both of said slides, means including a planetary gear train for rotating said spindle and said pinion in the same direction and normally at the same speed, said planetary gearing including a normally stationary element, a tool feed controlling motor, means operated by said motor for moving the normally stationary element of said planetary gearing, thereby to rotate said pinion relative to said spindle and cause movement of said tool carrying slides relative to said head, and means controlling said motor to prevent it from relatively moving said pinion and spindle through more than a predetermined angle, thereby to limit the radial strokes of the tool carrying slides.

8. In a machine tool, the combination of a frame, a hollow spindle mounted for rotation in said frame, a head secured to said spindle, a tool carrier mounted on the head for substantially radial movement of the tool, a rack on the tool carrier, a cross feed shaft extending through the spindle and having a pinion meshing with the rack, a first sun gear secured to the spindle, a second sun gear secured to the cross feed shaft, a freely rotatable internal gear common to both of said sun gears, a first set of planetary pinions meshing with the first sun gear and the internal gear, stationary bearing studs supporting the first set of planetary pinions, a second set of planetary pinions meshing with the second sun gear and with the internal gear, rotary means supporting the second set of planetary pinions for rotation about their respective axes, motor means to rotate the spindle, and reversible motor means for rotating said rotary means thereby to cause relative rotation of the spindle and cross feed shaft and thus cause cross feed movement of the tool carrier.

9. In a machine tool having a base, a carriage mounted for sliding movement on the base, a workpiece carrying fixture mounted rigidly with respect to the base, control means for causing reciprocation of the carriage on the base predetermined distances at predetermined rates, a hollow spindle having its axis extending in the direction of movement of the carriage and mounted for rotation therein, a tool carrying head secured to the end of the spindle, means for rigidly securing cutting tools to the head, a tool mounted for substantially radial movement on the head, a cross feed shaft extending through the spindle, a motor and gearing normally rotating the shaft and spindle in the same direction at the same speed, means for relatively rotating the cross feed shaft and the spindle to cause the radially movable tool to move inwardly and outwardly at predetermined rates and at predetermined times with respect to the movement of the carriage, and means to limit the extent of relative rotary movement of the shaft and spindle.

CHARLES R. PETERS.

REFERENCES CITED

The following references are of record in the file of this patent:

UNITED STATES PATENTS

| Number | Name | Date |
| --- | --- | --- |
| 632,230 | Berger | Sept. 5, 1899 |
| 1,100,747 | Krauss | June 23, 1914 |
| 1,567,705 | Burt | Dec. 29, 1925 |
| 1,594,903 | Gray | Aug. 3, 1926 |
| 1,994,879 | Tweit | Mar. 19, 1935 |
| 2,116,794 | LaFleur | May 10, 1938 |
| 2,392,074 | Wasson | Jan. 1, 1946 |
| 2,405,485 | Barkstrom | Aug. 6, 1946 |
| 2,410,355 | Nesbitt | Oct. 29, 1946 |

FOREIGN PATENTS

| Number | Country | Date |
| --- | --- | --- |
| 331,461 | Germany | Jan. 7, 1921 |